April 14, 1970   R. NOSCHINSKI ET AL   3,506,245
MIXING APPARATUS
Filed March 29, 1968   3 Sheets-Sheet 1
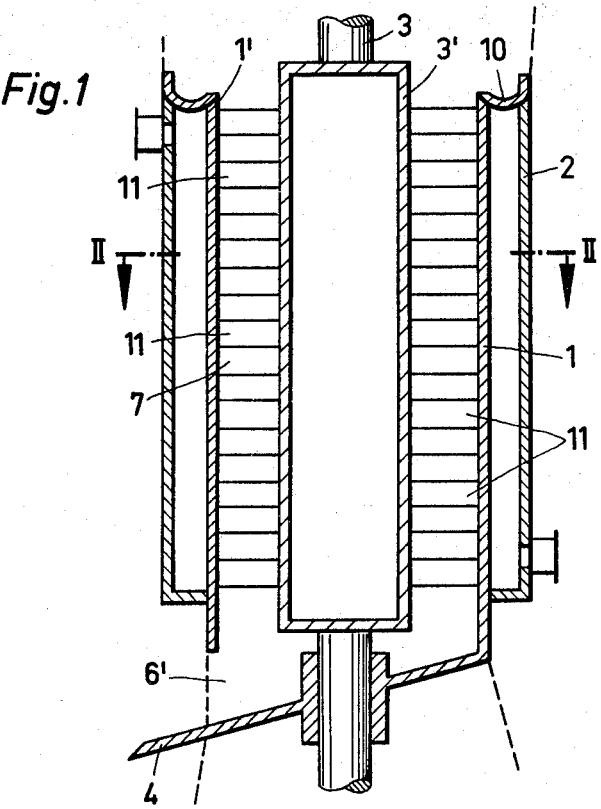
Fig.1
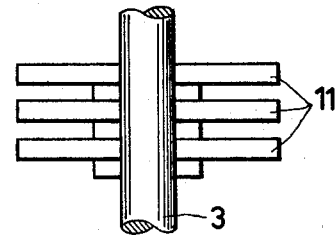
Fig.3
Fig.4
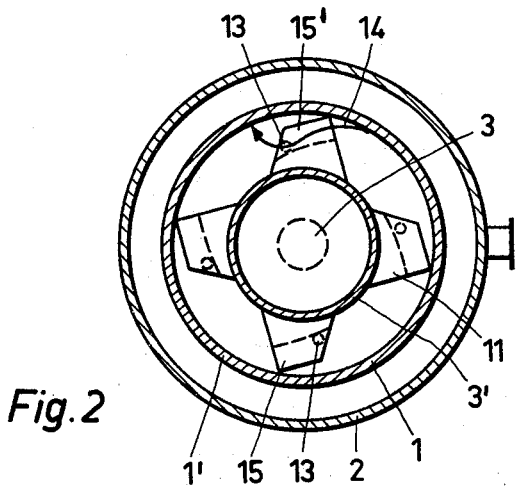
Fig.2

United States Patent Office 3,506,245
Patented Apr. 14, 1970

3,506,245
MIXING APPARATUS
Rüdiger Noschinski, Frankfurt am Main, and Hans Joachim Tückmantel, Massenheim, Germany, assignors to Maschinenfabrik J. S. Petzholdt, Frankfurt am Main, Germany
Filed Mar. 29, 1968, Ser. No. 717,160
Claims priority, application Germany, Mar. 31, 1967, P 41,765
Int. Cl. B01f 7/20
U.S. Cl. 259—8                                   7 Claims

ABSTRACT OF THE DISCLOSURE

A fluid, pasty mass is continuously mixed and homogenized as it descends vertically along a cylindrical wall by successively skimming the mass off the wall, spraying the skimmed mass by centrifugal force back against the wall, and repeating this in many superposed stages.

BACKGROUND AND SUMMARY OF THE INVENTION

The present invention relates to an apparatus for continuously mixing, homogenizing and aerating a fluid, pasty mass, such as liquefied cocoa nibs.

In the preparation of chocolate masses, the refining operation has been effectuated in apparatus working batchwise. This discontinuous operation is economically particularly objectionable because all operations before refining can be carried out continuously, thus forcing an interruption in the manufacturing process when the refining step is reached.

It is accordingly a primary object of the present invention to provide an apparatus for continuously mixing, homogenizing and aerating pasty or viscous masses of all types. When such an apparatus is used for refining chocolate masses, it permits the manufacturing process to be continuous from beginning to end, including the refining step.

The above and other objects are accomplished in accordance with this invention by an apparatus wherein the mixing, homogenizing and aerating zone is defined by a vertically extending cylindrical housing having a cylindrical inner wall. The fluid, pasty mass is delivered to the inner wall of the housing in the form of a film at the top of the housing, and the homogenized mass is discharged from the housing at the bottom thereof. A rotatable shaft is concentrically mounted along the axis of the cylindrical housing, the shaft and the inner housing wall defining an annular chamber constituting the working zone. A series of vertically superposed centrifugal elements is mounted on the shaft for rotation therewith, the centrifugal elements extending from the shaft towards the inner wall in the annular working zone chamber. A like series of vertically superposed devices is arranged to deliver fluid, pasty mass from the inner wall of the housing to a respective centrifugal element arranged below an associated device. In this manner, the mass is successively removed from an upper part of the inner wall and centrifugally thrown against an immediately lower part of the wall to descend along the wall from the delivery to the discharge means. Finally, means is provided for countercurrently delivering air through the annular working zone chamber.

In such an apparatus, the fluid mass is continuously delivered to the refining zone, passes through the zone in the form of a film while being repeatedly and successively mixed and constantly aerated, and the refined mass leaves the zone in a continuous stream.

BRIEF DESCRIPTION OF DRAWING

The above and other objects, advantages and features of the present invention will become more apparent in the following detailed description of certain now preferred embodiments thereof, taken in conjunction with the accompanying drawing wherein:

FIG. 1 is a schematic vertical section of one embodiment of the apparatus of this invention;
FIG. 2 is a section along line II—II of FIG. 1;
FIG. 3 shows the mass skimming device of this embodiment;
FIG. 4 schematically illustrates another embodiment of a detail of the invention;
FIG. 7b is a perspective view of FIG. 7a;
and
FIG. 8 schematically illustrates the effect of the arrangement of FIGS. 7 and 7a.

DETAILED DESCRIPTION

Figure 5:
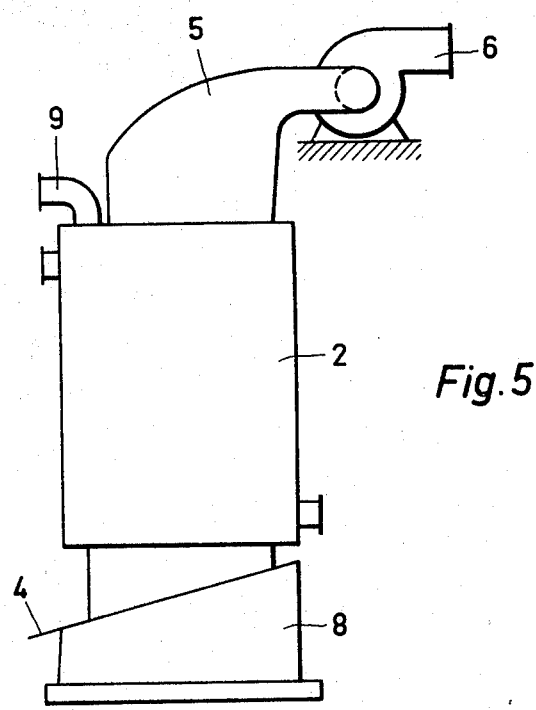
FIG. 5 is a schematic side view of the apparatus of FIG. 1.

Referring now to the drawing and first to FIGS. 1 to 3, there is shown a vertically extending cylindrical housing 1 having a cylindrical inner wall 1'. To keep the fluid, pasty mass delivered into the housing in liquid condition, the housing is surrounded by a heating jacket 2 through which a heating fluid, such as warm water, is circulated. A rotatable shaft 3 is mounted concentrically along the axis of housing 1, and in the embodiment of FIGS. 1 to 3, this shaft includes a hollow shaft portion 3' of larger diameter extending through the working zone of the cylindrical housing.

A fluid, pasty mass, such as cocoa nibs, is delivered to the inner wall of the housing in the form of a film at the top of the housing by means of a supply pipe 9 which opens into the circumferentially extending runner 10 at the top of the housing. The fluid mass then simply flows over the runner onto the inner wall 1' and descends by gravity through the working zone where it is subjected to a mixing, homogenizing and aerating action in a manner to be explained hereinafter. While the fluid mass descends, air is delivered countercurrently to the flow of the mass through the annular chamber 7 defined by the shaft portion 3' and the inner housing wall 1'. A suction hood 5 is mounted on top of the housing and a suction pump 6 communicates therewith to draw the air upwardly through the annular working zone from opening 6' at the bottom of the housing where air enters. The means for rotating shaft 3 are mounted in the stand 8 for the apparatus. The means for discharging the homogenized, aerated mass, such as refined cocoa nibs, is constituted by a chute 4 mounted at the bottom of the housing.

The mass delivered to the working zone in the housing is mixed and homogenized by a series of vertically superposed centrifugal elements mounted on the shaft for rotation therewith, and a like series of vertically superposed devices each arranged to deliver fluid, pasty mass from the inner housing wall to a respective one of the centrifugal elements arranged below an associated device. The centrifugal elements extend from the shaft towards the inner wall in annular chamber 7. In this manner, the mass is successively removed from an upper part of the inner wall and centrifugally thrown against an immediately lower part of the inner wall to descend from runner 10 to chute 4 along the inner wall 1'.

In the embodiment of FIGS. 1 to 3, the centrifugal elements are blades 11 having an outer edge 12' in skimming contact with the inner housing wall. A plurality of such blades are circumferentially spaced in respective horizontal planes vertically spaced from each other, the arrangement in each plane being shown in FIG. 2 for one such plane. Each blade has a lower surface defining a spray opening 13 arranged closer to the shaft than the outer edge 12'. Mass is delivered from the inner housing wall 1' to the spray openings 13 by a device including openings 12 at the outer edges 12' of the blades for receiving and skimming mass of the inner housing wall during rotation of the blades, and bores defined in the blades between the openings 12 and 13 to deliver skimmed mass to the spray openings 13 and centrifugally throw it from the latter openings against the inner wall, generally along the line of arrow 14 (FIG. 2). Shaft 3 rotates at sufficiently high speed to produce the desired centrifugal action.

In this manner, the fluid, pasty mass is constantly mixed, redistributed and aerated while being centrifugally thrown against the wall in finely divided state to assure thorough homogenization and aeration of the mass as it descends through the annular working zone in which the series of superposed centrifugal elements operate.

In the modification shown in FIG. 4, the centrifugal elements are circular discs 11' which are mounted directly on shaft 3 and are vertically separated by spacers. The discs are keyed to the shaft and rotate therewith, each disc receiving and skimming mass of the inner wall along its outer edge and delivering the skimmed mass to a spray opening in the lower surface of the disc in a manner analogous to that of the embodiment shown in FIGS. 2 and 3.

Figure 6:
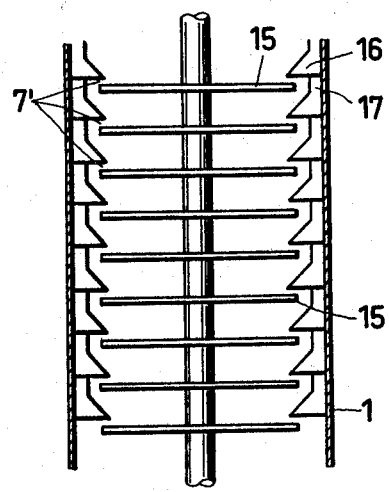
FIG. 6 is a view similar to that of FIG. 1 of another embodiment of the apparatus of the invention.

In the embodiment of FIG. 6, which only shows the working zone in housing 1, the centrifugal elements are circular discs 15 which rotate with the shaft to which they are fixed and centrifugally throw fluid, pasty mass delivered thereto against the inner wall of the housing. The devices for delivering the mass from the inner housing wall to the discs 15 are rings 16 arranged along the inner wall and spaced apart by ring spacer portions 17. Each ring 16 is arranged above an associated disc 15, and the inner diameter of rings 16 is smaller than the outer diameter of discs 15. In this manner, the descending film of the fluid, pasty mass drips off each ring 16 onto an associated disc 15 which throws it centrifugally against the inner housing wall whence it drips over the next lower ring 16 onto the next lower disc 15. If the mass is too viscous to move freely downwardly along the rings 17, doctor blade means may be attached to the rotating discs 15 to force the mass off the rings. Otherwise, this embodiment operates in the same manner as the one described more fully in connection with FIGS. 1 and 2.

If desired, the centrifugal elements may carry air moving means, such as obliquely mounted turbine blades and the like, to assist in forcing air upwardly through the working zone, such means being used in addition to, or instead of the illustrated suction or exhaust pump means.

Figure 7:
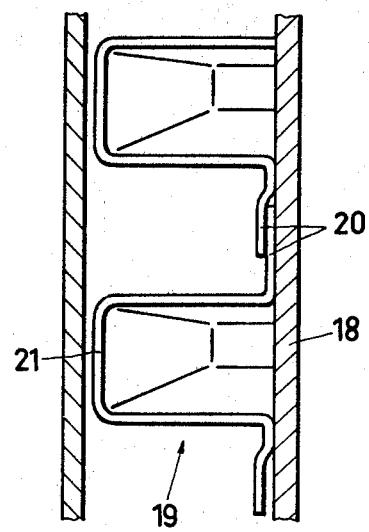
FIG. 7 is a partial sectional view showing another embodiment of a detail of the invention.
Figure 7B:
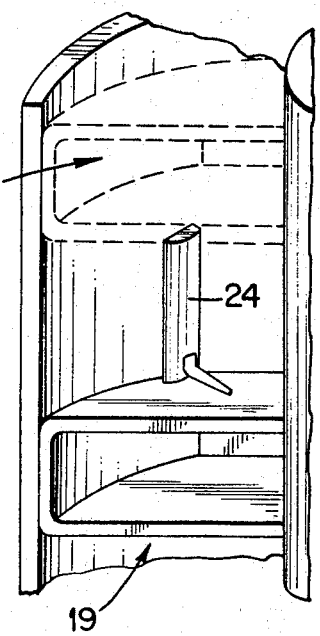
Figure 7A:
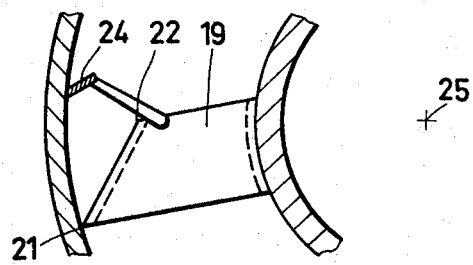
FIG. 7a shows one of the elements of FIG. 7 in top view.

FIGS. 7 and 7a show a particularly simple construction of the centrifugal elements and associated devices. In this embodiment, each element consists of a piece of shaped sheet metal, which shaped sheet metal pieces are fixed to rotatable shaft 18 in superposed relation, by means of clips 20. Each member 19 radially extends from the shaft 18 to the inner housing wall. Its forward edge 21 is in skimming contact with the inner wall and is arranged to deliver skimmed mass to a spray edge 22 arranged on each member 19 at a radial distance closer than that of the skimming edge 21, as best seen in FIG. 7a.

In the embodiments shown in FIGS. 2, 4 and 7, strips of fluid mass are along the inner housing wall, which flow downwardly along the wall into the range of the next lower device for skimming the mass off the wall. To avoid this, it is possible to mount doctor blade means having at least the same width as these strips of fluid mass behind the skimming devices or, preferably, the skimming devices may be horizontally staggered so that no mass strips will be formed which are not immediately in contact with some skimming device. The arrangement of doctor blades is shown at 24 in FIG. 7a.

Figure 8:
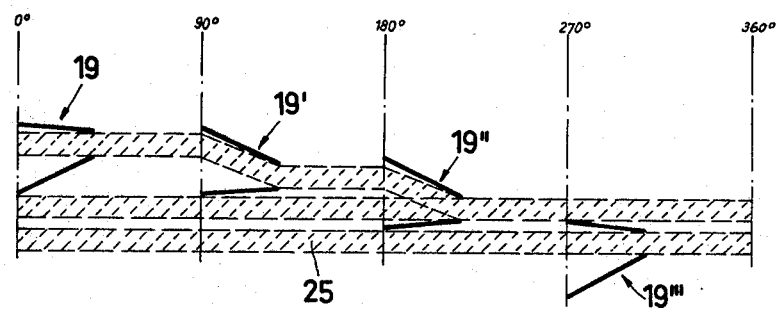

FIG. 8 shows an evoluted schema of elements 19 being arranged in a horizontally staggered arrangement around shaft 18. All the elements may be so staggered in the manner illustrated by members 19' and 19" or they may be so staggered that quiet zones 25 are interposed wherefrom the mass is again partially skimmed after one revolution of member 19" and wherefrom it partially flows downwardly and is then taken up by member 19''', which is followed by staggered members 19' and 19".

While the invention has been described and illustrated in connection with certain now preferred embodiments, it will be obvious that many variations and modifications may occur to those skilled in the art, particularly after benefiting from the present teaching, without departing from the spirit and scope of this invention as defined by the appended claims.

What we claim is:
1. An apparatus for continuously mixing, homogenizing and aerating a fluid, pasty mass, comprising
   (1) a vertically extending cylindrical housing having a cylindrical inner wall;
   (2) a delivery means for delivering the mass to the inner wall of the housing in the form of a film at the top of the housing;
   (3) a discharge means for the mass at the bottom of the housing;
   (4) a rotatable shaft concentrically mounted along the axis of the cylindrical housing, the shaft and the inner housing wall defining an annular chamber;
   (5) a series of vertically superposed blades mounted on the shaft for rotation therewith, each blade having an outer edge in skimming contact with the inner housing wall and a lower surface,
      (a) the lower surface of each blade defining a spray opening arranged closer to the shaft than the outer edge,
      (b) the blades having openings at their outer edges for receiving and skimming fluid, pasty mass off the inner housing wall during rotation of the blades, and
      (c) the blades defining bores between the spray openings and the openings at the outer edges to deliver the skimmed mass to the spray openings whence it is centrifugally thrown against the inner wall whereby the mass is successively removed from an upper part of the inner wall and centrifugally thrown against an immediately lower part of the inner housing wall and in this manner descends along the inner wall from the delivery to the discharge means; and
   (6) means for delivery air countercurrently to the flow of the mass through said annular chamber.

2. The apparatus of claim 1, wherein a plurality of said blades are circumferentially spaced in respective horizontal planes vertically spaced from each other.

3. The apparatus of claim 1, wherein the means for countercurrently delivering air through said annular chamber includes a suction pump means at the top of the housing and in communication with the annular chamber.

4. The apparatus of claim 1, wherein the shaft portion whereon the centrifugal elements are mounted is hollow.

5. The apparatus of claim 1, further comprising doctor blade means in contact with said blades and arranged behind said openings in the opposite direction from the direction of rotation of the shaft.

6. An apparatus for continuously mixing, homogenizing and aerating a fluid, pasty mass, comprising
   (1) a vertically extending cylindrical housing having a cylindrical inner wall;

(2) a delivery means for delivering the mass to the inner wall of the housing in the form of a film at the top of the housing;
(3) a discharge means for the mass at the bottom of the housing;
(4) a rotatable shaft concentrically mounted along the axis of the cylindrical housing, the shaft and the inner housing wall defining an annular chamber;
(5) a series of vertically superposed centrifugal elements mounted on the shaft for rotation therewith, the centrifugal elements extending from the shaft towards said inner wall in said annular chamber;
(6) a like series of vertically superposed devices each arranged to deliver fluid, pasty mass from the inner wall of the housing to a respective one of the centrifugal elements arranged below an associated one of said devices whereby the mass is successively removed from an upper part of the inner wall and centrifugally thrown against an immediately lower part of the inner housing wall and in this manner descends along the inner wall from the delivery to the discharge means,
  (a) each centrifugal element consisting of a member radially extending from the shaft to the inner wall and having a circumferentially extending spray edge, and
  (b) each device consisting of a forward edge arranged to deliver the mass from the inner wall to the spray edge and;
(7) means for delivering air countercurrently to the flow of the mass through said annular chamber.

7. An apparatus for continuously mixing, homogenizing and aerating a fluid, pasty mass, comprising
(1) a vertically extending cylindrical housing having a cylindrical inner wall;
(2) a delivery means for delivering the mass to the inner wall of the housing in the form of a film at the top of the housing;
(3) a discharge means for the mass at the bottom of the housing;
(4) a rotatable shaft concentrically mounted along the axis of the cylindrical housing, the shaft and the inner housing wall defining an annular chamber;
(5) a series of vertically superposed centrifugal elements mounted on the shaft for rotation therewith, the centrifugal elements extending from the shaft to said inner wall in said annular chamber;
(6) a like series of vertically superposed devices each arranged to deliver fluid, pasty mass from the inner wall of the housing to a respective one of the centrifugal elements arranged below an associated one of said devices whereby the mass is successively removed from an upper part of the inner wall and centrifugally thrown against an immediately lower part of the inner housing wall and in this manner descends along the inner wall from the delivery to the discharge means; and
(7) means for delivering air countercurrently to the flow of the mass through said annular chamber.

References Cited
UNITED STATES PATENTS

| | | | |
|---|---|---|---|
| 1,703,654 | 2/1929 | Becker | 259—8 XR |
| 2,313,705 | 3/1943 | Jack. | |
| 2,692,127 | 10/1954 | Conn | 259—134 |
| 3,072,464 | 1/1963 | Akaboshi et al. | |
| 3,110,646 | 11/1963 | Mayhew et al. | 259—7 XR |
| 3,254,877 | 6/1966 | Goodwin | 259—8 |
| 3,290,016 | 12/1966 | Lennon et al. | 259—108 |

WALTER A. SCHEEL, Primary Examiner

J. M. BELL, Assistant Examiner

U.S. Cl. X.R.

99—236; 159—6; 259—96; 261—89